United States Patent
Capo

(10) Patent No.: US 8,942,640 B2
(45) Date of Patent: Jan. 27, 2015

(54) ABSOLUTE CONTROL OF VIRTUAL SWITCHES

(75) Inventor: Luciano Capo, Bresso (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 681 days.

(21) Appl. No.: 13/060,702

(22) PCT Filed: Aug. 27, 2008

(86) PCT No.: PCT/EP2008/061207
§ 371 (c)(1),
(2), (4) Date: Feb. 25, 2011

(87) PCT Pub. No.: WO2010/022771
PCT Pub. Date: Mar. 4, 2010

(65) Prior Publication Data
US 2011/0159820 A1 Jun. 30, 2011

(51) Int. Cl.
*H04B 1/00* (2006.01)
*H04L 12/24* (2006.01)
*G06F 11/07* (2006.01)
*H04L 12/12* (2006.01)
*H04L 29/14* (2006.01)

(52) U.S. Cl.
CPC ........ *H04L 41/0659* (2013.01); *G06F 11/0757* (2013.01); *H04L 12/12* (2013.01); *H04L 69/40* (2013.01); *Y02B 60/34* (2013.01)
USPC .......................................................... 455/68

(58) Field of Classification Search
CPC . G06F 11/0757; H04L 12/12; H04L 41/0659; H04L 69/40
USPC .......................... 455/68, 422.1; 370/216, 229
See application file for complete search history.

(56) References Cited

U.S. PATENT DOCUMENTS

| | | | |
|---|---|---|---|
| 6,208,616 B1 | 3/2001 | Mahalingam et al. | |
| 6,981,048 B1 | 12/2005 | Abdolbaghian et al. | |
| 7,492,704 B2* | 2/2009 | Jain et al. | 370/216 |
| 7,613,108 B2* | 11/2009 | Takehara et al. | 370/222 |
| 7,756,010 B2* | 7/2010 | Ramanan et al. | 370/216 |
| 7,880,616 B2* | 2/2011 | Kanagala et al. | 340/572.1 |
| 2004/0034807 A1 | 2/2004 | Rostowfske | |
| 2004/0107273 A1 | 6/2004 | Biran et al. | |
| 2006/0182255 A1* | 8/2006 | Luck et al. | 379/220.01 |
| 2008/0062897 A1* | 3/2008 | Loffink et al. | 370/294 |
| 2009/0197589 A1* | 8/2009 | Kitazoe | 455/422.1 |
| 2011/0131321 A1* | 6/2011 | Black et al. | 709/224 |
| 2012/0017105 A1* | 1/2012 | Thyni et al. | 713/323 |

FOREIGN PATENT DOCUMENTS

WO    WO 2004/051497 A1    6/2004

* cited by examiner

*Primary Examiner* — David Bilodeau

(57) ABSTRACT

A telecommunications device for a telecommunications network comprises a controller configured to enable or disable said telecommunications device to reception and/or transmission of telecommunications data. The controller is further configured to generate a plurality of keep-alive signals for the telecommunications device. The telecommunications device is disabled to reception or transmission of said telecommunications data if no keep-alive signal is received by the telecommunications device after a predetermined time.

5 Claims, 3 Drawing Sheets

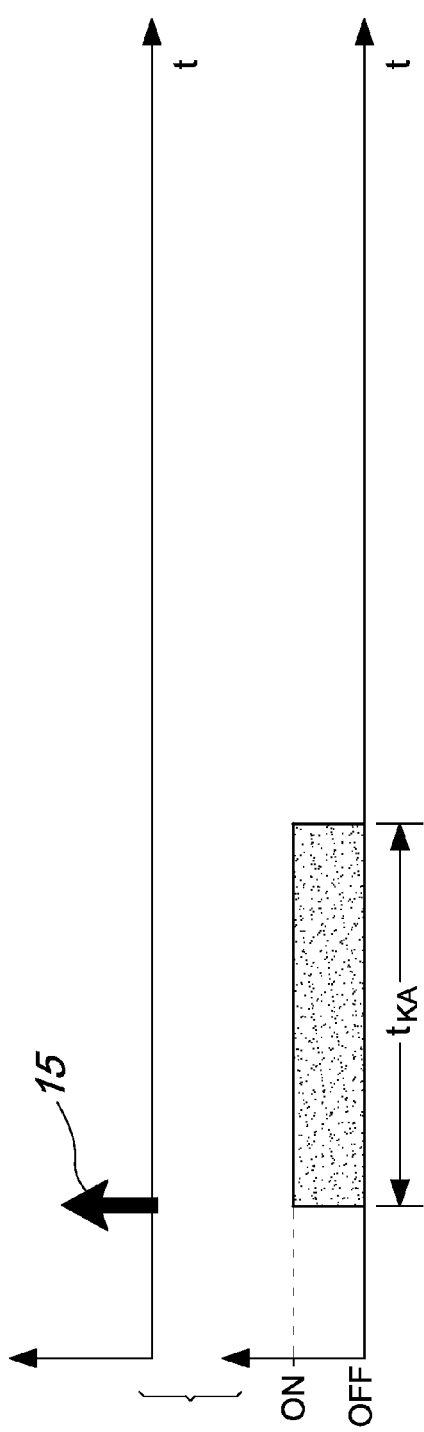
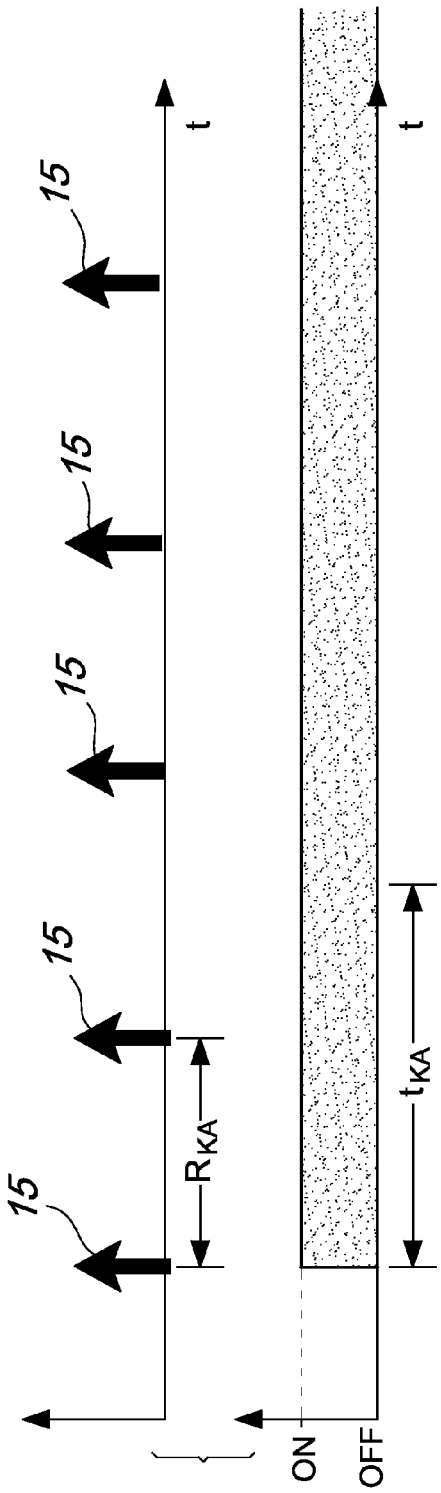

ABSOLUTE CONTROL OF VIRTUAL SWITCHES

CLAIM OF PRIORITY

This application is a 371 of PCT/EP 08/61207 filed in Aug. 27, 2008 the contents of which are hereby incorporated by reference herein.

Technical field

The present invention relates to protection schemes for telecommunications networks which employ virtual switches. In particular, the invention regards telecommunications devices, networks and methods which use virtual switches for switching data to a back-up telecommunications resource when a fault occurs.

BACKGROUND

In modern telecommunications networks, traffic needs to be protected against failures in order to give very high service availability.

Transmission resources are accordingly redundant and back-up resources are provided in addition to service resources. A failure is recovered in a very short time by routing traffic from the faulty service resource to a back-up resource.

Routing of traffic is often made by means of physical switches, electronic or even electro-mechanic, which disconnect the faulty resource and connect the back-up one.

In some cases there are no physical switches and the routing of traffic from the faulty resource to the back-up resource is done by a simultaneous turning on/turning off of transceiver of the back-up/backed-up resource. Such simultaneous switching is referred to as virtual switch.

Examples of virtual switches can be found in radio equipment protection where the air interface is common to service and back-up radio equipment. Other virtual switches can be found in protection equipment of electrical and optical interfaces based on external power splitters and combiners. These elements are provided externally to the equipment in order to maximize the fault coverage, placing the switch element at the extreme edge of the unit to protect. As in radio protection, in these cases service and back-up resources share the same physical medium, i.e. the same electrical or optical line.

A key aspect of protection schemes is robustness, namely, the ability of the protection scheme to accomplish the protection switching action in any failure scenario. Robustness can be impaired by a number of reasons, among which there is the incomplete control of the protection switch because, for instance, of the unavailability of controllers involved in the protection operations.

Once the switching action is performed by means of physical switches, unavailability of the control chain is not a big issue because a physical switch features only two states so that service is assigned in a mutually exclusive way to only one of the two resources.

The situation is completely different in case of the switch is a virtual switch rather than a physical switch.

FIG. 1 depicts a known protection group based on virtual switches, where only one working resource 1 to be backed-up and one back-up resource 2 are shown. In the figure, the two resources 1 and 2 are connected at one end to a same communication medium (e.g. air, an optical fiber, or an electrical cable) as if a virtual switch 3 were present for switching traffic to/from the active resource 1 or 2, while at the other end a physical switch 4 is provided, which can be physically operated for switching traffic from/to the active resource 1 or 2.

This configuration is a typical one: virtual switches are usually present only at one side of the resource, while physical switches are at the other side, normally inside the equipment.

In order to implement a virtual switch 3, each of the resources 1 and 2 comprises a controller for switching on or switching off the corresponding transceiver or other active elements of the resource and, accordingly, enabling or disabling the entire resource to reception/transmission of telecommunications data.

The transceiver or the active elements of the resource are set active, in a nearly static way, by turning on the transceiver, while the protection is set inactive by setting off the transceiver.

Once a protection switching is requested, the controllers take care of switching the traffic by reversing the setting of both transceivers. Occurrence of a protection switching is a very rare event so that setting is assumed to be nearly static.

A virtual switch is the result of two coordinated, but distinct, actions: turning off active elements in the faulty resource 1 and turning on active elements in the back-up resource 2.

Failure of one of this actions leads to an inconsistent status, both resource active or inactive, with subsequent service disruption. An inconsistent status needs an intervention by an operator to manually recover proper operation.

As already mentioned above, these inconsistent scenarios may happen in case of unavailability of one of the controllers just because of the failure. Even a communication failure between controllers can lead to inconsistent status of the virtual switch. The scenario can be further complicated when a plurality of controllers are present as it happens in complex protection schemes.

SUMMARY

It is an object of the invention to obviate at least some of the above drawbacks and provide an improved device and method particularly suitable to prevent inconsistent status in protection schemes employing virtual switches.

This object and other objects which will become better apparent hereinafter are solved by a telecommunications device for a telecommunications network, which comprises a controller configured to enable or disable said telecommunications device to reception and/or transmission of telecommunications data. The controller is configured to generate a plurality of consecutive keep-alive signals for the telecommunications device. The telecommunications device also comprises means for disabling the telecommunications device to reception and/or transmission of the telecommunications data if no keep-alive signal is received by the telecommunications device after a predetermined time.

Each keep-alive signal of said plurality of keep-alive signals preferably consists of one pulse or a digital signal.

The telecommunications device may comprise a traffic processing unit for processing the telecommunications data. In this case, the means for disabling the telecommunications device may comprise a transceiving unit connected to the traffic processing unit for interfacing the traffic processing unit to a communication medium of the telecommunication network. The controller may be connected to such transceiving unit and comprise means for sending the keep-alive signals to the transceiving unit at predetermined instants or on a periodic basis.

The transceiving unit may be configured to remain switched on as long as it receives keep-alive signals and to switch off itself if no keep-alive signal from the controller is received after the above predetermined time.

Advantageously, the transceiving unit may comprise a counter or a monostable circuit for switching off the transceiving unit if no keep-alive signal from the controller is received after the above predetermined time.

Preferably, the controller is configured to generate the keep-alive signals on a periodic basis, such that the time distance between any two adjacent keep-alive signals is less than the predetermined time.

The above aim and objects of the invention are achieved by a telecommunications network comprising at least one working telecommunications device which is normally active and at least one back-up telecommunications device which is normally disabled. The working telecommunications device and the back-up telecommunications devices are connected to a same communication medium of the telecommunications network and are configured to implement a virtual switch for switching telecommunications data from the working telecommunications device to the back-up telecommunications device when a fault occurs. The working telecommunications device comprises a controller configured to enable or disable the working telecommunications device to reception and/or transmission of telecommunications data from and to the communication medium. In accordance with the invention, such controller is further configured to generate a plurality of consecutive keep-alive signals for the working telecommunications device and the working telecommunications device comprises means for disabling itself to reception and/or transmission of the telecommunications data if it receives no keep-alive signal after a predetermined time.

The working telecommunications device may comprise the same features of the telecommunications device described above. In particular, it may comprise a traffic processing unit for processing the telecommunications data. The means for disabling the working telecommunications device may comprise a first transceiving unit connected to the traffic processing unit for interfacing the traffic processing unit to the communication medium of the telecommunications network. The controller of the working telecommunications device may be connected to such first transceiving unit and comprising means for sending said keep-alive signals to said transceiving unit at predetermined instants or on a periodic basis.

Similarly, the back-up telecommunications device may comprise a back-up traffic processing unit, a second transceiving unit and a second controller. The back-up traffic processing unit is preferably configured as the traffic processing unit of the respective working telecommunications device so as to operate as the respective working telecommunications device when the latter is disabled.

In this case, the second transceiving unit of the back-up telecommunications device may be connected to the back-up traffic processing unit for interfacing the back-up traffic processing unit to the communication medium of the telecommunications network. The second controller, instead, may be connected to the second transceiving unit and comprise means for sending keep-alive signals to the second transceiving unit at predetermined instants or on a periodic basis.

The first or the second transceiving units may be configured to remain switched on as long as it receives keep-alive signals and to switch off itself if no keep-alive signal is received after the predetermined time from the respective controller to which the first or second transceiving unit is connected.

Such controller may be configured to generate keep-alive signals on a periodic basis, such that the time distance between any two adjacent keep-alive signals is less than the above predetermined time.

Moreover, the aim and the objects of the invention are achieved by a method for implementing a protection scheme in a telecommunications network which comprises at least one working telecommunications device and at least one back-up telecommunications device connected to a same communication medium of the telecommunications network. In the method, a plurality of consecutive keep-alive signals is supplied to the working telecommunications device, which is disabled if no keep-alive signal is received by the working telecommunications device after a predetermined time. If so, the back-up telecommunications device is enabled, so as to switch traffic for the working telecommunications device to the back-up telecommunications device.

For disabling the working telecommunications device, a transceiving unit of the same and connected to the communications medium may be switched off. The keep-alive signals may be supplied to the transceiving unit at predetermined instants or on a periodic basis.

The time distance between any two adjacent keep-alive signals is preferably less than such predetermined time.

Brief description of the drawings

Further characteristics and advantages of the invention will become better apparent from the detailed description of particular but not exclusive embodiments, illustrated by way of non-limiting examples in the accompanying drawings, wherein:

FIG. 3 shows a time behavior of the keep-alive signal and the activation status of the resource according to an aspect of the invention;

FIG. 4 shows the time behavior of the keep-alive signal and the activation status of the resource according to a preferred embodiment of the invention;

Detailed description

Figure 1:
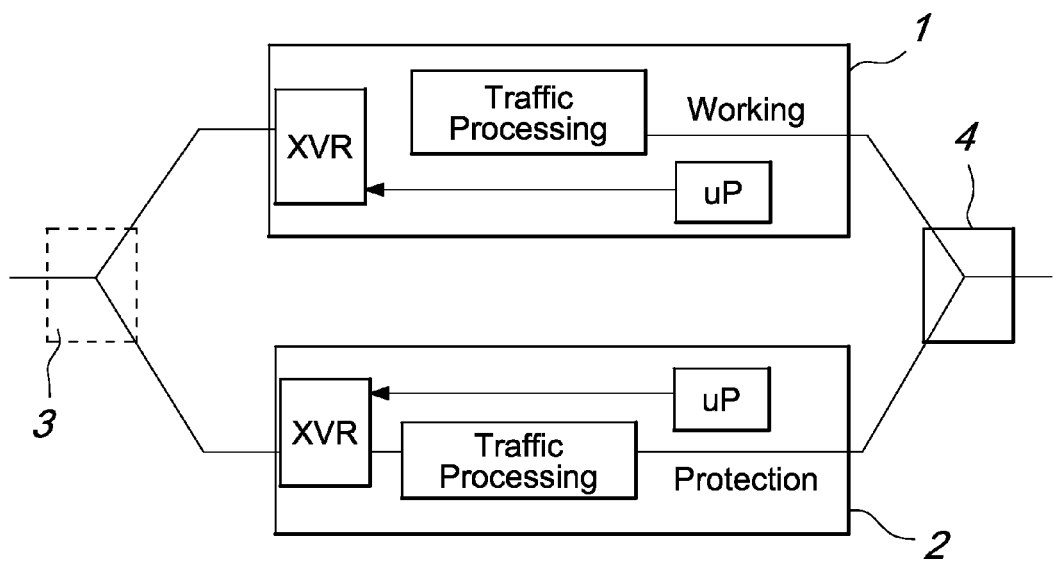
FIG. 1 is a prior art telecommunications network employing a virtual switch.
Figure 2:
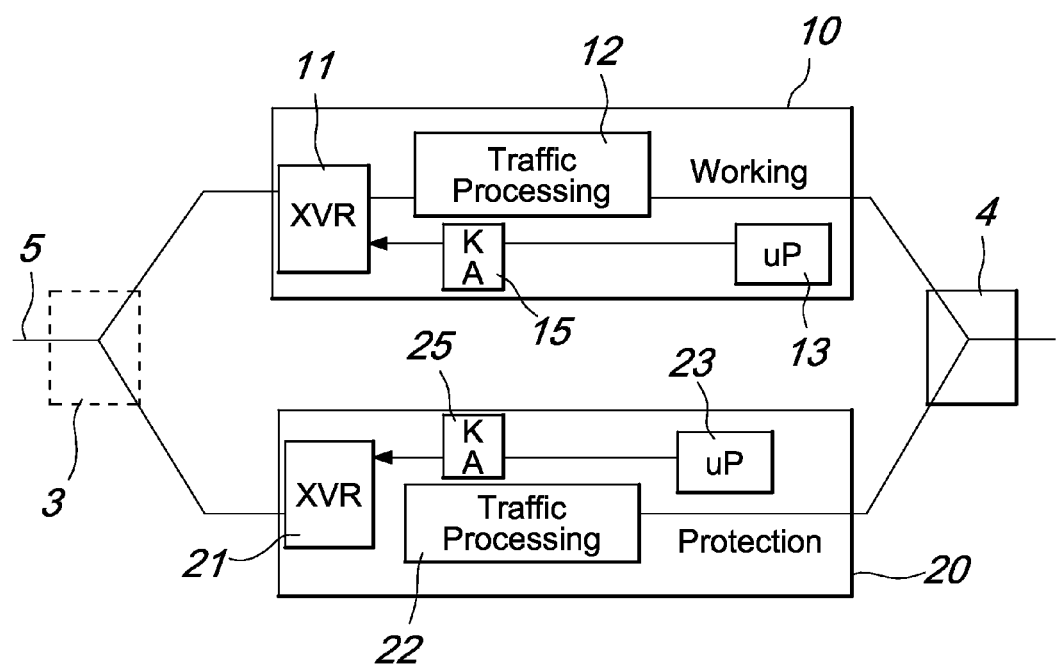
FIG. 2 shows telecommunications devices implementing a virtual switch according to an embodiment of the invention.

With reference to FIG. 2, a network according to an embodiment of the invention may comprise a working resource 10 and a back-up resource 20. More in general, in the network there may be any number N of working resources and any number M of back-up resources, with N not necessarily equal to M.

As in FIG. 2, the two resources 10 and 20 are front-end devices which are both connected to a shared communication medium 5, such as air for radio communications, an optical fiber for optical communications, an electrical cable for other communications.

At the opposite end of the resources 10 and 20 a physical switch 4 may be provided, e.g. for exchanging digital data with other processing components.

A virtual switch 3 is implemented in both of the resources for switching traffic to/from the active one of such resources.

The working resource 10 comprises at least one transceiving unit 11 connected to the communication medium 5 and a traffic processing unit 12 connected to the transceiving unit 11.

The transceiving unit 11 is adapted to accept traffic to or from the communication medium 5, and may be any receiver and/or transmitter apparatus, of the outdoor or the indoor kind, such as an antenna with the respective modem, a laser and the respective driving circuit, or a photodetector.

Instead, the traffic processing unit 12 is configured so as to receive process traffic data from the transceiving unit 11 or send processed traffic data to the transceiving unit 11. As shown in FIG. 2, the traffic processing unit 12 may be also connected to the physical switch 4, so as to communicate with other nodes or resources of the network.

Although they have been depicted separately, the transceiving unit 11 and the traffic processing unit 12 may also be incorporated into a single device or may be even divided out into a number of different devices having specific processing or communication functions.

The working resource 10 further comprises a controller, such as a microprocessor 13, which is connected to the transceiving unit 11 and is configured to switch on and switch off the transceiving unit 11, based on the active status of the working resource 10.

A similar configuration may be also provided in the back-up resource 20. In particular, the back-up resource 20 may comprise a back-up transceiving unit 21 a back-up traffic processing unit 22 and a back-up microprocessor 23 for the activation/deactivation of the transceiving unit 21. The back-up processing unit 22 may be configured as the traffic processing unit 12, so that the back-up resource 20, in the protection mode, processes data exactly as the respective working resource 10.

According to the invention, at least the working resource 10 is configured to forcedly be in a known status, the inactive one, whenever the resource 10 is not controllable because of physical faults impairing the communication process and/or the controlling processors themselves.

To this aim, the microprocessor 13 may be configured to send a keep-alive signal 15 to the respective transceiving unit 11, either on a periodic basis or at predetermined instants. The microprocessor 23 of the back-up resource 20 may be configured in a similar way, i.e. for sending keep-alive signals 25 to the back-up transceiving unit 21.

The keep-alive signal 15, 25 may be a pulse, a digital signal having only two amplitude values (high/low), or a message suitably coded so as to be interpreted by the transceiving unit 11, 21 as a command for switching on or off the transceiving unit itself.

On the other hand, the transceiving unit 11 is configured to remain turned on only for a predetermined time $t_{KA}$ starting from the reception of a keep-alive signal 15 and to turn off itself at the end of the predetermined time $t_{KA}$ if no more keep-alive signals are received by the transceiving unit 11 (FIG. 3). This configuration may be achieved, for instance, by a suitable counter or an analog monostable circuit provided in the transceiving unit.

Optionally, the back-up transceiving unit 21 may be similarly configured, so as to remain in the "on" state only for a predetermined time interval and to turn off at the end of such time interval.

Accordingly, for continuously keeping the resource 10 or 20 in the active status, a plurality of keep-alive signals 15, 25 are sent to the respective transceiving unit 11, 21 by the respective microprocessor 13, 23 so that the time distance $R_{KA}$ between two adjacent keep-alive signals is less than the keep-alive time $t_{KA}$.

Preferably, the microprocessors are configured to generate and send the keep-alive signals 15, 25 on a periodic basis, i.e. the time distance $R_{KA}$ is constant in time, as shown in FIG. 4. The value of $R_{KA}$ is fixed based on the desired protection switch response time.

The keep-alive signal 15, 25 controlling the respective transceiving unit 11, 21 is preferably active high in order to supply power to the transceiving unit in the active state. As a consequence, if no keep-alive signals reach the transceiving unit, the latter will turn off because of lack of power supply.

In order to handle open faults, i.e. the floating state of the pin of the transceiving unit 11 or 21 to which the control line from the microprocessor carrying the keep-alive signals is connected, a pull down resistor may be tied to such control line, so as to force the pin voltage to a known state.

The keep-alive messaging according to the invention may be used in different arrangements of the communication resources. For instance, with reference to FIG. 5, a network employing the invention may comprise a working branch with two working resources 100 and 300 and a back-up branch with two back-up resources 200 and 400. A virtual switch 30 is implemented through a suitable protection protocol used for communication between the controllers of the resources 100, 200, 300 and 400. A physical switch 40 may be connected to the second working resource 300 and the second back-up resource 400.

As in the embodiment of FIG. 2, the first working resource 100 is connected to the communication medium 5 and comprises a transceiving unit 110, a traffic processing unit 112 and a microprocessor 113. Instead, the second working resource 300 comprises a second traffic processing unit 312 connected to the traffic processing unit 112 of the first working resource, so that in normal conditions processed traffic data can be transmitted from one traffic processing unit to the other for further elaboration.

Similarly, the first back-up resource 200 comprises a transceiving unit 210, a back-up traffic processing unit 212 and a microprocessor 213 and is connected to the same communication medium 5 as the first working resource 100.

The second back-up resource 400 may comprise a second traffic processing unit 412 connected to the traffic processing unit 212 of the first back-up resource 200 so that, when the virtual switch 30 enables the back-up branch 200, 400 and disables the working branch 100, 300, processed traffic data can be transmitted from one back-up unit to the other for performing the same elaboration of the working branch 100, 300.

Figure 5:
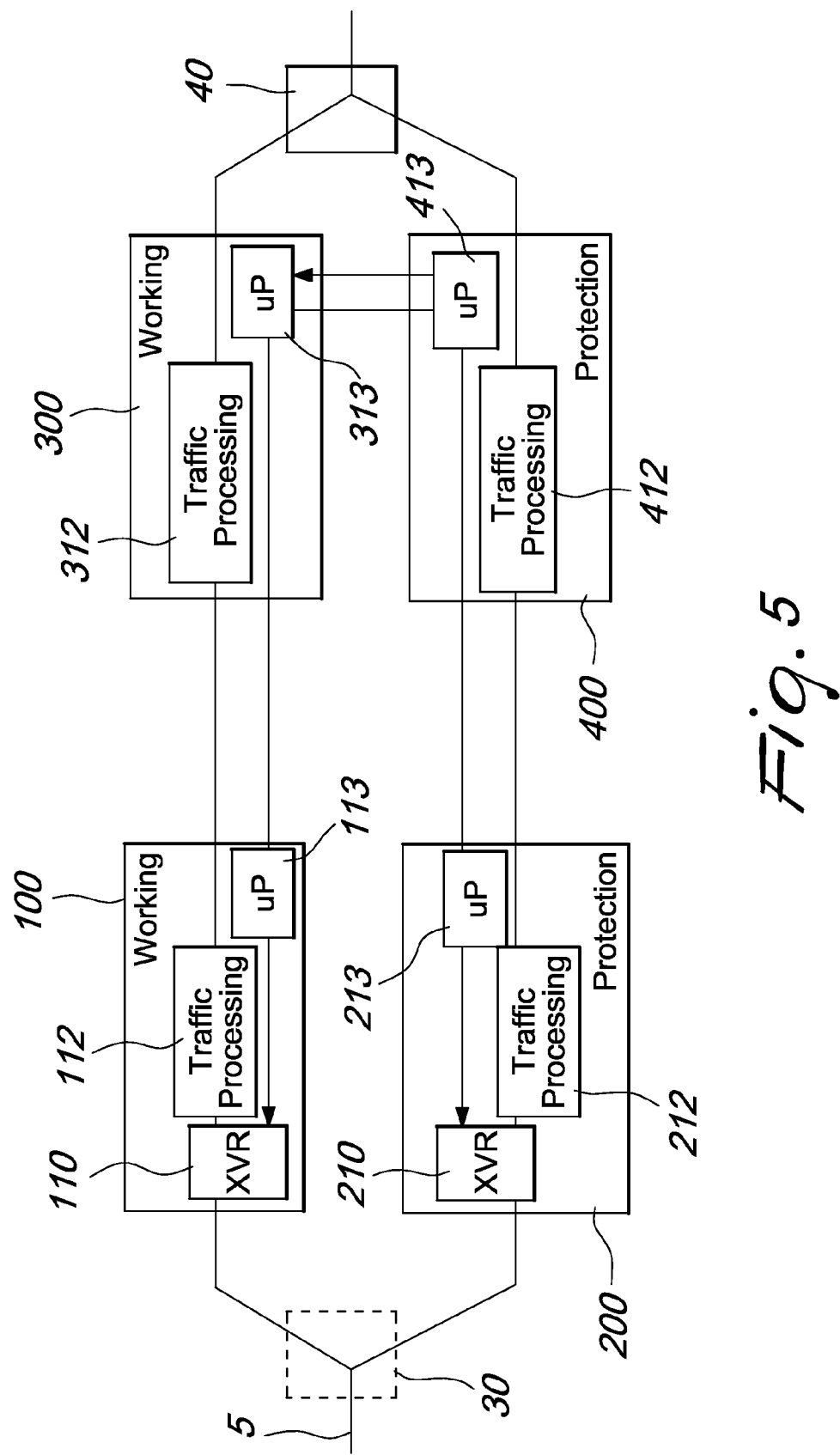
FIG. 5 is a possible complex protection architecture employing the invention.

The working and back-up resources further comprise respective controllers, such as microprocessors 113, 213, 313 and 413, which are connected to one another and can communicate via suitable protection protocol of a known kind for implementing a protection scheme. In the embodiment of FIG. 5, it is noted that the microprocessor 313 of the second working resource 300 is connected to both the microprocessor 113 of the first working resource 100 and the microprocessor 413 of the second back-up resource 400, which is also connected to the microprocessor 213 of the first back-up resource 200.

The operation of the embodiment of FIG. 5 is as follows. During normal conditions, microprocessor 313 periodically sends keep-alive signals to the transceiving unit 110 via microprocessor 113.

If a fault occurs at microprocessor 113, the keep-alive signals cannot be forwarded to the transceiving unit 110, which will accordingly turn off, disabling the working resource 100.

Similarly, if a fault occurs at microprocessor 313 or in the communication line or channel connecting microprocessor 313 with microprocessor 113, the keep-alive signals will not reach the transceiving unit 110, which will turn off and accordingly disable the working resource 100.

In both cases, the protection protocol used between the microprocessors 113, 213, 313 and 413 will handle these fault situation in a known way, by activating the back-up branch.

It has been shown that the invention fully achieves the intended aim. In particular, the invention avoids inconsistent states of the virtual switch by pursuing an absolute control of the same. A dynamic setting of the transceiver status is obtained, which is robust and effective irrespective of the number of processors used in the control of the protection scheme.

Clearly, several modifications will be apparent to and can he readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for implementing a protection scheme in a telecommunications network comprising a working telecommunications device and a back-up telecommunications device connected to a same communication medium of the telecommunications network, the method implemented by the working telecommunication device comprises steps of:
    supplying a plurality of consecutive keep-alive from a controller to a transceiving unit, where the working telecommunication device comprises the controller and the transceiving unit;
    disabling the transceivinq unit if no keep-alive signal from said controller is received after a predetermined time, wherein the transceiving unit is connected to the same communication medium of the telecommunications network;
    after disabling the transceiving unit, enabling the back-up telecommunications device, so as to switch traffic for the working telecommunications device to the back-up telecommunications device.

2. The method of claim 1, wherein said supplying step comprising supplying said keep-alive signals at predetermined instants or on a periodic basis to said transceiving unit.

3. The method of claim 1, wherein a time distance between any two adjacent keep-alive signals is less than said predetermined time.

4. The method of claim 1, wherein said keep-alive signals are active high to supply power to the transceiving unit.

5. The method of claim 1, wherein said transceiving unit has a pin connected to a control line to the controller, wherein the control line has a pull-down resistor connected thereto so as to force a voltage on the pin to a known state to handle an open fault.

* * * * *